Dec. 1, 1931. J. H. CRAWFORD 1,834,090
AUTOMATIC COAL CUTTER AND LOADER
Filed July 1, 1925 2 Sheets-Sheet 1
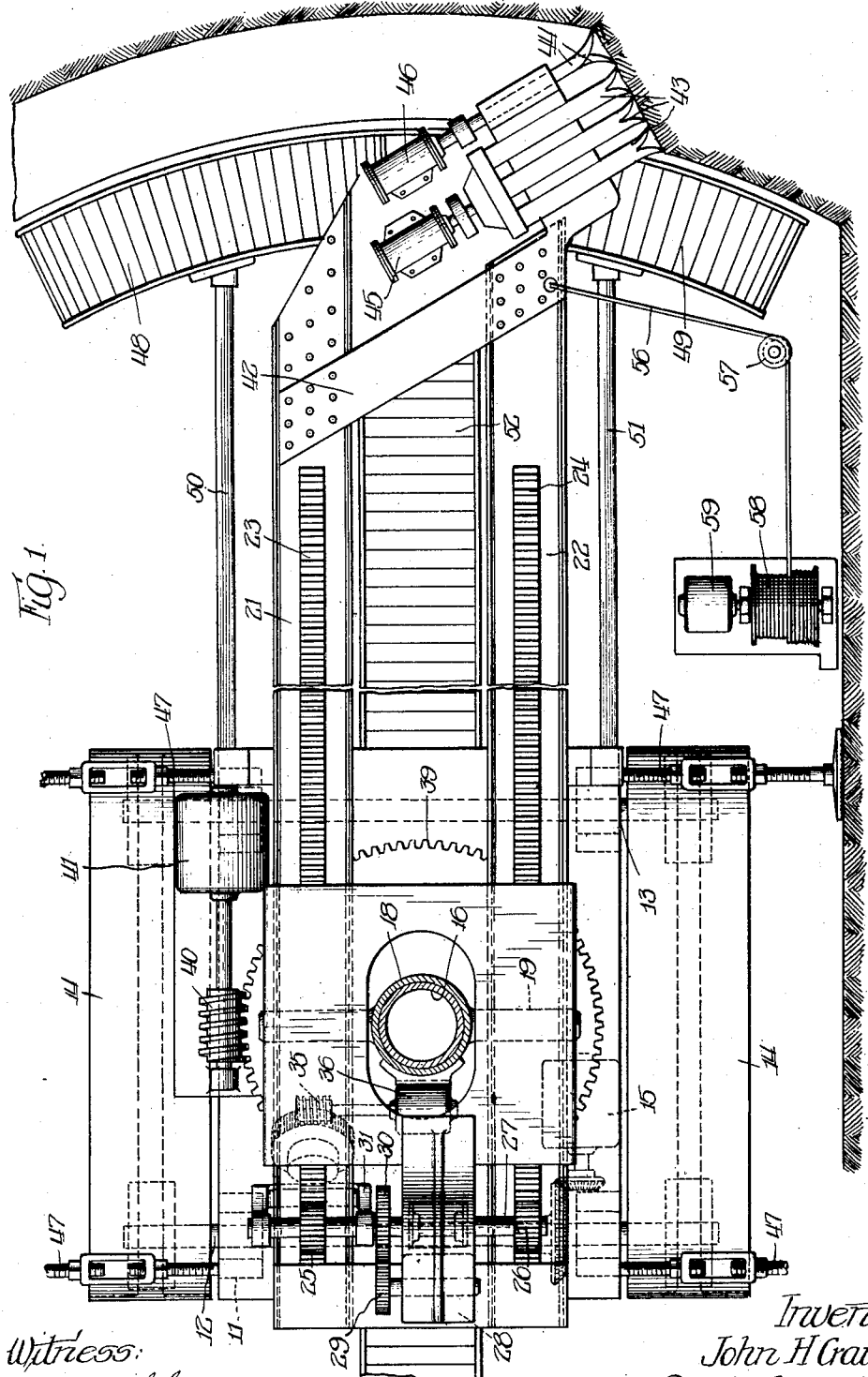

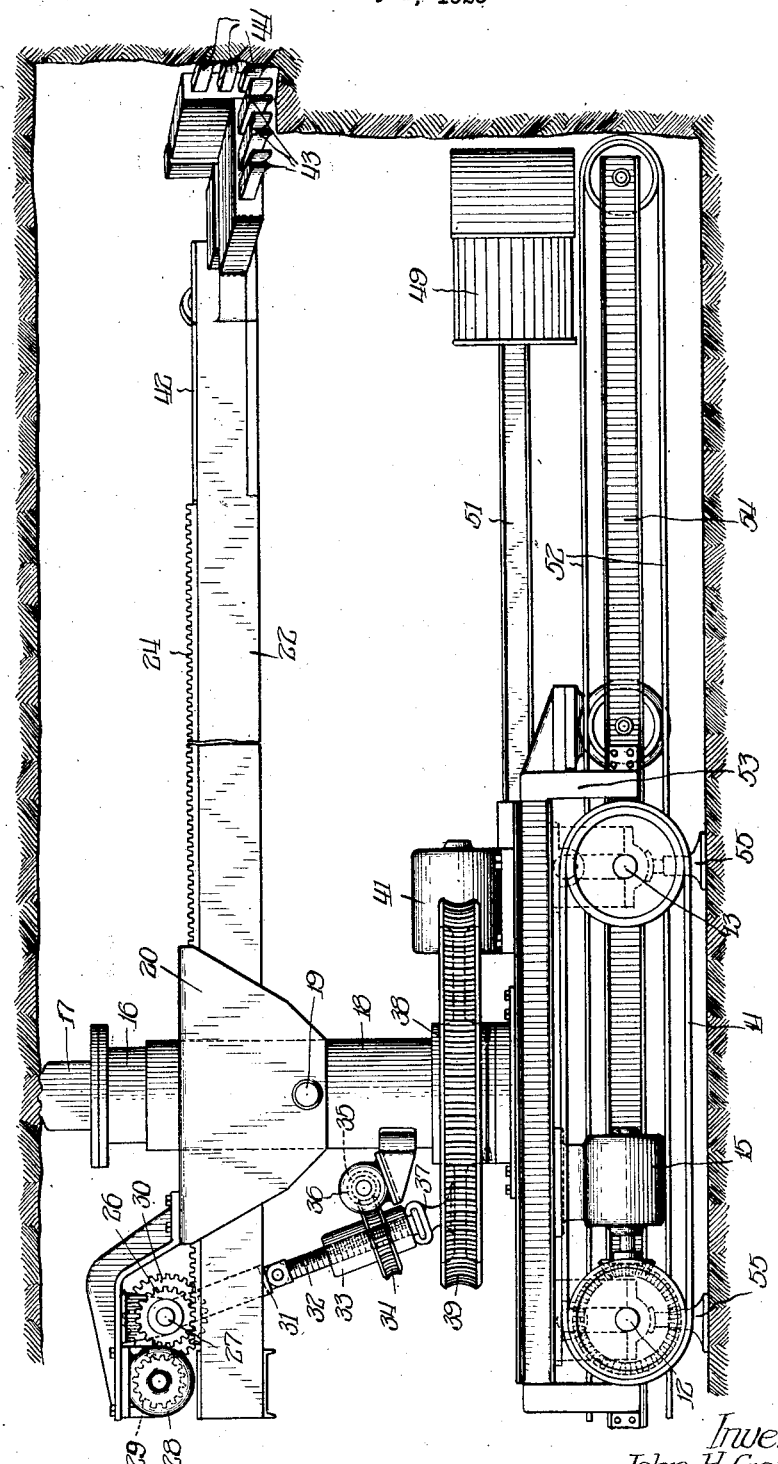

Patented Dec. 1, 1931

1,834,090

UNITED STATES PATENT OFFICE

JOHN H. CRAWFORD, OF HARRISBURG, ILLINOIS, ASSIGNOR TO CRAWFORD AUTOMATIC SHOVEL CO., OF HARRISBURG, ILLINOIS, A CORPORATION OF ILLINOIS

AUTOMATIC COAL CUTTER AND LOADER

Application filed July 1, 1925. Serial No. 40,724.

This invention relates to a new and improved coal cutter and loader and more particularly, to an apparatus of this type adapted to make a horizontal, swinging cut in a coal or ore face.

This invention is in the nature of a modification or improvement of the mining apparatus disclosed in my Patent No. 1,617,941, dated February 15, 1927. In the patent, an apparatus was shown adapted to make a horizontal swinging cut in an ore or coal seam, and in one form shown, it was necessary to revolve the cutting scoop or shovel to discharge the material cut. The swinging movement was imparted by means of worm gears which rotated the shovel about a vertical axis.

In the form of construction shown in the present application, the material is loosened by a horizontally swinging cutting member and the coal or ore is preferably carried away by continuously operating conveyors. Means are provided for fully stabilizing the platform and for applying power to the cutting members other than by a worm and worm gear on the platform.

I have illustrated somewhat diagrammatically the present form of apparatus in the accompanying drawings, in which Figure 1 is a plan view and
Figure 2 is a side elevation.

The platform 11 is supported by axles 12 and 13 from the caterpillar or continuous treads 14 and is propelled by the motor 15. The platform carries the vertical pivot member 16 from the top of which extends a jack member 17 adapted to engage the roof of the chamber. The sleeve 18 is rotatably carried by the member 16 and carries the trunnions 19 upon which is supported the cradle 20. The cutter carrying arms 21 and 22 are supported in the cradle 20 and are provided with the racks 23 and 24 which mesh with gears 25 and 26 carried by shaft 27. The shaft 27 is driven by motor 28 through gears 29 and 30.

The link 31 is secured to the shaft 27 and at its lower end is pivotally connected to the threaded member 32. This member 32 is screwed into the rotatable sleeve 33 which latter carries the worm gear 34 driven by worm 35 from motor 36. The member 33 is rotatably supported in the bracket 37 which extends upwardly from the circular drive member 38. This member 38 is fixedly secured to the sleeve 18 and rotates with the sleeve about the pivot member 16. The member 38 is driven by means of its worm gear 39 and the worm 40 upon the shaft of the motor 41.

The outer ends of the members 21 and 22 are connected together by the frame 42 which carries the horizontal cutting teeth 43 and vertical cutting teeth 44. The teeth 43 are reciprocated by a plunger connected to a piston operating in cylinder 45 and the teeth 44 are similarly reciprocated by power supplied by means of the cylinder 46.

Laterally extending jacks or braces 47 may be provided to engage the walls of the chamber to more rigidly brace the apparatus. The oppositely operating conveyors 48 and 49 are supported from the platform 11 by means of the members 50 and 51. These conveyors discharge on to the longitudinally extending conveyor 52 which is supported from the platform 11 by the hangers 53 and beams 54. This conveyor may extend back to any desired place of discharge. These conveyors may be operated by suitable motors which have not been shown as the details of the conveyor construction may be of any usual design and form no part of the present invention.

Referring particularly to Figure 2, the apparatus is provided with the vertical jacks 55 located under the axles 12 and 13 and adapted to rigidly support the entire apparatus. Additional means for turning the cutting members may be provided consisting of the cable 56 passing around pulley 57 to the drum 58 driven by motor 59. The pulley 57 may be anchored in any suitable manner and the drum and motor may also be anchored in any suitable manner at any desired location.

In the operation of the apparatus, the cutters are swung in an arc from left to right to give a cutting stroke. This swinging movement may be accomplished by means of power supplied by motor 41 to the worm 40 meshing with worm gear 39. If additional power is desired this may be supplied by motor 59 hauling on cable 56. By suitably locating the pulley 57, a large leverage may be secured. During this cutting movement, the cutting teeth may be reciprocated as desired by power supplied to the cylinders 45 and 46 by compressed air or other suitable medium. The cut material falls to the conveyors 48 and 49 and is carried by them to the conveyor 52 which carries it to any suitable point of discharge. The cutting members are swung back to begin a new stroke by power supplied to motor 41. The cutting members may be advanced to cut further into the material by extending the members 21 and 22 through power supplied by motor 28 and the associated gears and racks. The cutting elements may be swung up and down by power supplied by motor 36 which swings up and down the cradle 20 about the trunnions 19.

It will be understood that during operation the apparatus is fixedly held in place by means of the jacks 55, the top jacks 17 and the lateral struts or jacks 47. Due to the up and down movement by tilting the cradle and to the extending movement by racking out the cutting members quite a large extent of material can be cut and carried out and loaded without moving the apparatus. When it is desired to move it, the jacks and struts are released and the machine moves forward under its own power supplied by motor 15. The pulley 57 may have its location changed as often as is necessary.

To simplify the machine to a greater extent than is possible with other types of apparatus, I have shown the rope haulage mechanism as a separate unit independent of the main machine. In this case, the unit is mounted upon its own base or truck and may be equipped with any desired means for firm anchorage. This unit can be so set that the cable pull will be more direct and hence be more efficient. For example, the main cutter machine can be set to make the most advantageous cut, which is entirely possible with my type of device, for the reason that I do not necessarily have to make a full face cut to the absolute clearing point of the teeth at the right hand side of the entry, but can terminate the cut at a point which gives the desired entry width and then reverse the boom and return to the starting point of the cut. At the latter side it may be desirable to start at the beginning of the half circle and, to make advance of the machine regular and to eliminate any manual labor in trimming the rib on this left hand side, it is preferable to start this way. The total cut then, is somewhat less than a 180° swing of the boom or something like 150° total, the right hand limit of the cut being in solid coal and leaving a fairly straight rib as the machine advances.

The separate drum unit is, in this case, set at the right hand side of the machine and well up to the right rib in the sector more or less occupied by the unnecessary 30° of cut mentioned above and thus is able to pull directly upon the cutter head without waste of effort. One setup is thus sufficient for several advances of the main cutter machine. In reality it is not practicable to have a drum design applicable to changing angles of pull on the cable, without great complexity of design and construction, hence one deflection pulley is used, in the separate unit drum as shown on the drawings, where this unit is shown in relation to the rest of the mechanism.

The right hand rib is shown cut square and the main cutter machine is thus somewhat offset from the center line of the room or entry. The starting or initial cut is made on the left hand rib on a line with the transverse center line of the main machine trucks. Due to the angle of tooth projection from the end of the boom however, it is possible to start the initial cut considerably ahead of the junction of the transverse center line of the machine with the left hand rib and thus enable me to reduce the total angle of cut still further from 150°, without sacrificing any appreciable width of entry. It may thus be possible to reduce the angle of cut to 135° or 140° and thus make the efficiency of the cable pull very satisfactory, which saves still more time in reducing the idle swing of boom without loss of coal production to any great extent.

While I have shown certain preferred embodiments of my invention these are to be understood as illustrative only and I contemplate such changes and modifications as come within the spirit and scope of the accompanying claims.

I claim:

1. A mining machine adapted to dig and remove material from a substantially vertical mine wall face, comprising a single digging and raking device, having teeth placed at a penetrating angle to the mine face, means for swinging said device from side to side for cutting and raking operations, and a conveyor extending across the mine face, and located closely adjacent thereto to receive the dug and raked material as it falls by gravity from the mine face.

2. A mining machine adapted to dig and remove material from a substantially vertical mine wall face, comprising a single digging and raking device, having teeth placed at a penetrating angle to the mine face, means for swinging said device from side to side for cutting and raking operations, and a conveyor located below said device to receive by gravity the dug and raked material from the mine face, said digging and raking means being mounted in addition for vertical movement and movement toward and away from the mine face.

3. In a mining machine the combination of a movable platform, a conveyor carried by said platform, having a portion extending across the face of the mine wall in close proximity thereto, and adjacent the floor of the mine, a combined digging and raking device, a boom therefor, means mounting said boom for movement from side to side for digging material from the mine face, and for vertical adjusting movement, and for a forward and backward raking movement, and means for moving and controlling the movement of said boom, said digging and raking device having teeth placed at a penetrating angle to the face of the mine wall and being adapted to advance and move laterally on a digging stroke inwardly of the mine wall face and ahead of the end of said conveyor, and to be retracted in a raking operation so as to deposit by gravity the freed material onto said conveyor.

Signed at Harrisburg, Illinois, this 20 day of June, 1925.

JOHN H. CRAWFORD.